March 27, 1962  S. L. BURGWIN ET AL  3,027,471
GAS BEARING SPIN MOTOR

Filed April 4, 1960  3 Sheets-Sheet 1

INVENTORS
STEPHEN L. BURGWIN
CARL GREEN

BY Roger W. Jensen

ATTORNEY

March 27, 1962

S. L. BURGWIN ET AL 3,027,471

GAS BEARING SPIN MOTOR

Filed April 4, 1960

INVENTORS
STEPHEN L. BURGWIN
CARL GREEN

BY Roger W. Jensen

ATTORNEY

INVENTORS
STEPHEN L. BURGWIN
CARL GREEN

BY Roger W. Jensen

ATTORNEY

3,027,471
GAS BEARING SPIN MOTOR
Stephen L. Burgwin, Clearwater, and Carl Green, Pinellas County, Fla., assignors to Minneapolis-Honeywell Regulator Company, Minneapolis, Minn., a corporation of Delaware
Filed Apr. 4, 1960, Ser. No. 19,761
17 Claims. (Cl. 310—74)

This invention pertains generally to control apparatus and more specifically to a gas bearing spin motor having special although not exclusive application to the field of precision inertial instruments such as gyroscopes and accelerometers. The invention has special application to hydrodynamic or "self-generating" gas bearing spin motors which provide their own pumping action for providing a load supporting film of gas between relatively rotating parts.

Heretofore various prior art gas bearing spin motors for gyroscopes have been proposed and have taken various configurations In such a motor both radial bearings and axial thrust bearings are required Quite often electric motor means are used to rotate the rotor assembly relative to the stator assembly and such motor means inherently produce or dissipate a certain amount of heat. The heat so dissipated causes relative movement between some of the motor components due to unequal expansion thereof and also due to variation in temperatures (temperature gradients) within the motor and such unequal expansion or movement can have very adverse effects on the bearings. For example, in one prior art type of gas bearing gyro spin motor, a pair of widely separate axial thrust bearings are provided. In this motor there is such a long differential thermal expansion path connecting the thrust bearings that relatively large gaps must be provided between the relatively rotating parts of the thrust bearing in order to prevent seizing. Further, with this prior art motor it was found necessary to place the stator including the winding means external of the rotor element in order to minimize the temperature problem by removing this source of heat from the differential thermal expansion path. However, as those skilled in the art know, it is inefficient from the standpoint of maximizing the angular momentum of a gyro wheel for a given size of unit, to have the stator external of the rotor. Stated otherwise, for a given size of unit a maximum angular momentum is obtained by having the rotor positioned external of a centrally positioned stator element.

In the present invention a unique gas bearing spin motor is provided having only a single centrally positioned thrust element. This in combination with a unique rotor produces an extremely short differential thermal expansion path from one face of the thrust element through the rotor to the other face and through the thrust element back to the first face. With the short differential thermal expansion path, there is very little change in the thickness of the film of gas or clearance between the stationary and rotating parts of the thrust bearing under either start-up or operating conditions. By having a relatively thin film of gas or lubricant between the relatively rotating parts of the bearings, a maximum "stiffness" effect is obtained. Generally the "stiffer" the bearing, the better the overall zero performance. With the present invention it is practical to have the stator unit contained within the rotor unit so as to obtain a maximum angular momentum for a given size motor unit.

Briefly, the present invention provides in one embodiment a gyro spin motor comprising in part a shaft member having a centrally positioned thrust plate which has a thrust bearing surface on each axial face thereof. Also mounted on the shaft are motor means which are positioned symmetrically on both sides of the thrust plate. The motor further includes a rotor assembly comprising in part a pair of end-bell members each having an axially extending hollow drum portion including means adapted to coact with the motor means and having one end thereof substantially closd off with a centrally positioned radial bearing portion with an axial bore therethrough. The hollow drum portion of the end-bell further has a flanged portion radially extending from the other end thereof and the flanged portion has a thrust bearing surface thereon. The two end-bells are adapted to be connected together and preferably are secured to opposite axial faces of a momentum ring. The end-bells and momentum ring are adapted to be assembled with respect to the stator assembly so that the ends of the stator shaft are positioned in the axial bores of the radial bearings and with the bearing surfaces of the flanged portions positioned adjacent to the thrust bearing surfaces on the thrust plate. The momentum ring is dimensioned so that the thrust bearing surfaces on the end-bells are spaced away from one another by an amount slightly greater than the axial spacing of the bearing surfaces on the thrust plate.

Various means are provided for generating the gas pressure used for maintaining separation between the relatively rotating parts of the thrust bearing and between the relatively rotating parts of the radial bearings. In one embodiment the gas pressure generating or pumping means is a plurality of spiral grooves which may be either on the thrust plate or on the flanged portion of the end-bells. The spiral grooves are adapted to provide a pumping action when there is relative rotation between the stator assembly and rotor assembly. In the preferred embodiment, the spiral grooves are oriented so that the pressure near the outer periphery of the thrust plate is less than the pressure at a point closer to the rotational axis. Stated otherwise, a pressure gradient is produced which is an inverse function of the distance away from the rotor spin axis. Having the pressure higher near the inner part of the thrust plate results in this higher pressure being applied to the substantially closed off portions of the end-bells. This has a very advantageous effect in supporting the rotor assembly in an axial sense. This will be explained in greater detail below.

The radial bearings for the gyro spin motor of the present invention are hydrodynamic or self-generating journal bearings and are designed to support radial loads fully independently of gas pressure applied thereto as a result of the thrust bearing action. As will be explained in more detail below, the central thrust bearing causes a gas pressure to be applied to the radial bearing. However, the pressure built up by the thrust bearing is not essential to operation of the radial bearings although it does give some super charging effect, which is effective in increasing the load carrying capacity of the radial bearing. The small clearance required for satisfactory operation of a hydrodynamic journal bearing provides a high resistance leakage path between the pressurized inner chamber of the end-bell and the external ambient pressure, thereby functioning as a rotating shaft seal.

Generally the present invention provides a gas bearing gyro spin motor having a very high lift-to-drag ratio which is an important feature of the present invention. The "lift" is the amount of support provided by the bearings and the "drag" is the frictional restraint on the rotor. The frictional restraint is largely a first order effect "viscous drag" and to a lesser degree, a higher ordered effect termed "windage." The present invention, in maximizing the lift-to-drag ratio, permits the stator weight to be reduced. This occurs because the present invention requires substantially less torque for imparting rotation to a given size rotor assembly in comparison to prior art arrangements. The reduction in stator weight is very important because it, as a practical matter, enables the rotor weight to be increased. This is especially true in a so-called floated gyro where, for a given gimbal size, the total motor weight including both the stator and rotor is limited. There is a limit on the total motor weight due to the fact that a gimbal can displace only a certain amount of fluid. Therefore, by minimizing the weight of the stator, the rotor weight can be maximized thus bringing to a maximum the total angular momentum of the rotor which is very important and desirable in gyroscopic apparatus.

It will be understood that in a gas bearing gyro spin motor operating at running speed the power input to the motor must equal only the losses caused by the "drag" which as indicated includes viscous drag and windage in comparison to a "prime mover" type of motor which is driving a load. Thus in a gas bearing gyro motor, any significant reduction in the "drag" or stated otherwsie, any significant increase in the "lift-to-drag" ratio has a very important effect on the required power input. The present invention meets the objective of a very high "lift-to-drag" ratio by the unique combination of thrust and radial bearing means described herein and including the single centrally positioned thrust bearing element plus two pressure chambers bounded by the two end-bells. Another important feature of the present invention which contributes to the high "lift-to-drag" ratio is that the thrust bearing surfaces are located as close as possible to the spin axis. This keeps the "drag" torque arm as short as possible. The single central thrust element with its attendant short differential thermal expansion path contributes greatly to the high "lift-to-drag" ratio because it permits much shorter gaps or clearances between the relatively rotating parts of the thrust bearings and correspondingly increases the "lift." It will be understood that a decreased gap will also cause higher viscous losses but the "lift" tends to increase faster for a decreasing gap than the viscous losses increase.

It is therefore an object of this invention to provide an improved control apparatus.

Another object of the invention is to provide an improved gas bearing spin motor.

A further object of the invention is to provide a self-generating gas bearing spin motor having a short differential thermal expansion path connecting the thrust bearing source.

Still another object of the invention is to provide a gas bearing spin motor having a very high lift-to-drag ratio.

Other and more specific objects of the invention, including constructional details and the operation of the gas bearing spin motors embodying our invention, will be set forth more fully in and will become apparent from a reading of the following specification and appended claims, in conjunction with the accompanying drawing in which:

Figure 1:
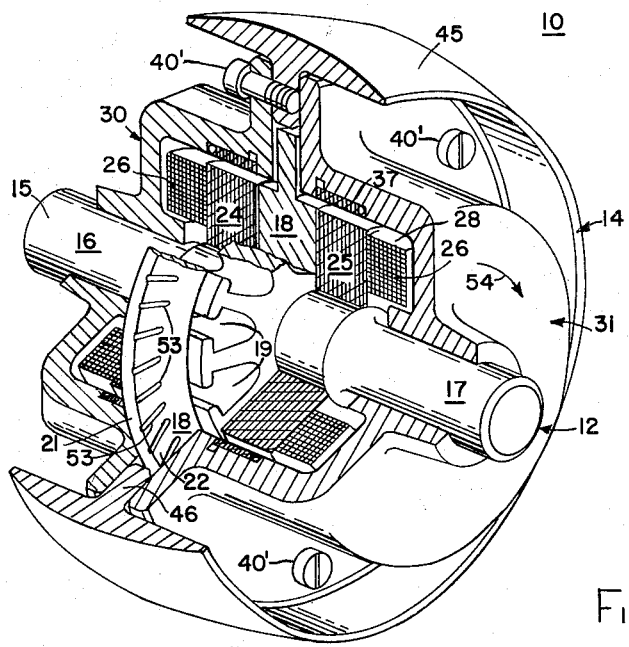
FIGURE 1 is a cross-sectional perspective view of a typical self-lubricated gas bearing spin motor embodying the teaching of the present invention.

Referring to FIGURE 1 the reference numeral 10 generally depicts a self-generating gas bearing spin motor comprising a stator assembly 12 and a rotor assembly 14. The stator assembly 12 includes a shaft member 15 having cylindrical or rounded or journal portions 16 and 17 adjacent the ends thereof and a centrally positioned radially extending thrust element or thrust plate 18. The thrust element 18 may either be integral with shaft member 15 or may be suitably secured thereto.

The thrust element or thrust plate 18 has a plurality of winding openings or windows 19 circumferentially arranged, a generally circular periphery 21 and a pair of axially spaced axial thrust bearing surfaces 22 and 23, only one of which is viewable in FIGURE 1.

The stator assembly 12 further includes motor means of any suitable type, the specific motor shown being an electric motor of the hysteresis type. The motor means includes laminated core means 24 and 25 positioned respectively on opposite sides of the thrust plate 18. The core means 24 and 25 are shown to have a common winding means 26 which passes through suitable winding openings in the core means and openings 19 in the thrust plate 18. The winding means 26 may be of any suitable type adapted to be energized so as to produce a rotating magnetic field. Generally the motor stator means including the cores 24 and 25 and the winding means 26 have a substantially circular periphery 28 which is somewhat smaller in diameter than that of the periphery 21 of the thrust plate 18.

Figure 2:
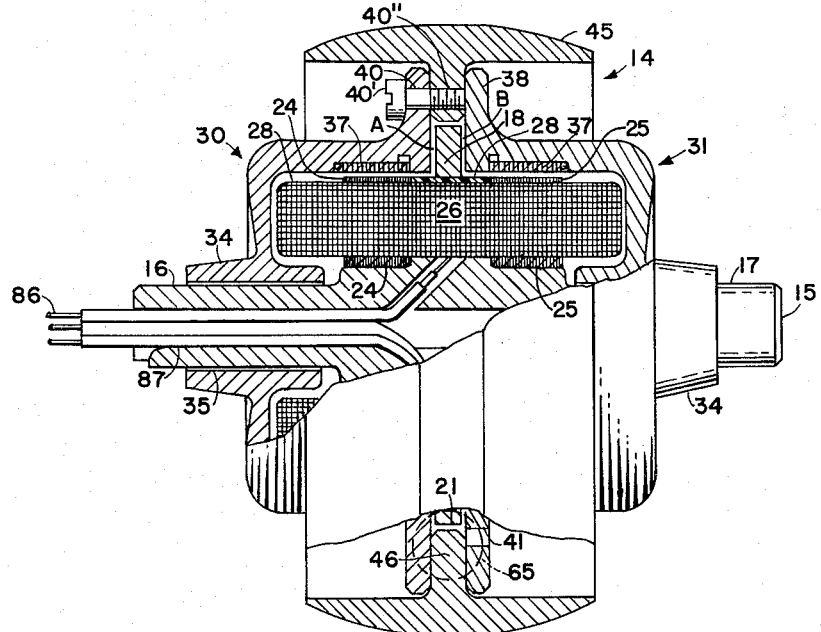
FIGURE 2 is a cross-sectional view of a spin motor substantially similar to that of FIGURE 1.
Figure 3:
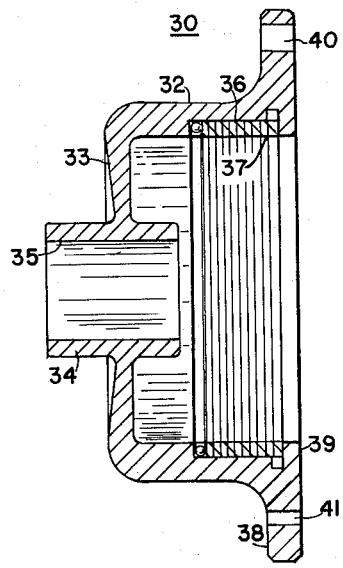
FIGURE 3 is a cross-sectional view of one of the end-bell members.

The rotor assembly comprises in part a pair of end-bell members 30 and 31. A typical end-bell configuration is shown in FIGURE 3. Each end-bell has an axially extending hollow drum or casing portion 32 one end of which is substantially closed off by an end wall or radial bearing portion 33 which generally extends radially inward and terminates in a hublike portion 34 of substantial axial length and having an axial bore 35 therethrough. The bore 35 is slightly larger in diameter than the cylindrical portions 16 and 17 of the shaft member 15 (FIGURE 1 and 2). The drum or casing portion 32 is provided with an internal circumferential recess 36 adapted to receive an electric motor rotor element 37 such as a laminated hysteresis ring. The other end of the drum portion 32 is characterized by having a radially extending flanged portion 38 having an axial face 39. The flanged portion 38 has a plurality of axially extending circular apertures 40 near the outer periphery thereof and also has additional apertures 41 extending axially therethrough, the apertures 41 being somewhat closer to the rotational center of the end-bell than apertures 40.

The rotor assembly 14 further includes a momentum ring 45 which may take various shapes and which as shown in FIGURE 1 has a "T-like" cross section. The radial or web portion 46 of the momentum ring is adapted to be abutted by the outermost portion of the axial face 39 of the flanged portions 38 of the bells 30 and 31.

The spin motor shown in FIGURE 1 is provided with a plurality of grooves 53 in the axial faces 22 and 23 of the thrust plate 18 which are adapted to generate gas pressure when there is relative rotation between the stator assembly 12 and the rotor assembly 14. The arrangement shown in FIGURE 1 is somewhat schematic but does illustrate that the groves may be on the relatively stationary part of the thrust bearing.

In order for the grooves to generate or develop gas pressure, there must be a component of velocity along the groove. This is accomplished by arranging the grooves with both a radial and circumferential component of extent and as shown in FIGURE 1 the preferred direction of relative rotation between the stator and rotor would be in the direction of the arrow 54. With this arrangement the pressure gradient will be an inverse function of the distance away from the spin axis. That is, the gas pressure at the periphery 28 of the motor means will be higher than the pressure at the periphery 21 of the thrust plate 18. For the reverse direction of rotation the pressure at surface 21 would exceed the pressure at surface 28.

The grooves 53 as shown in FIGURE 1 are depicted as being substantially straight, lying at an angle with respect to a radial line emanating from the spin axis so as to have both a radial and circumferential component of extent. The scope of the invention shall include other groove configurations such as the known "spiral grooves." Also, in some cases, surface configurations other than grooves may be used, examples being tapered lands and "Rayleigh Steps." While certain of the possible surface configurations will not build up pressure within the end-bell chambers, they will provide sufficient pressure over the thrust bearing area to result in an operable motor.

The means such as the grooves for providing the gas pressure when there is relative rotation between the stator assembly and the rotor assembly may be on the rotor assembly. This is the embodiment depicted in FIGURES 2, 3 and 4. Generally in FIGURES 2-4 parts which are identical to those shown in FIGURE 1 are identified by the same reference numerals. Thus, referring to FIGURE 2, a shaft 15 is provided with cylindrical end portions 16 and 17. The shaft has centrally mounted thereon a thrust plate 18 having a substantially circular periphery 21. The motor core elements 24 and 25 are mounted on suitable enlarged portions of the shaft 15 and bonded thereto by suitable means not shown and the winding means 26 is wound through suitable apertures in the core means and thrust plate. The end-bells 30 and 31 are adapted to be assembled together with the momentrum ring 45 so as to enclose the stator assembly. The axial faces 39 of the flanged portions 38 of the end-bells 30 and 31 are adapted to be abutted against the radial portion 46 of the momentum ring and held in assembled relationship by suitable means such as machine screws 40' passing through the apertures 40 and being threaded into suitable threaded apertures 40' in the momentum ring. Generally the momentum ring has an inner diameter somewhat larger than the diameter of the thrust plate 18. The hysteresis ring means 37 are positioned so as to be in register with the core means 24 and 25 of the motor stator. It will be understood that this is one arrangement for imparting rotation to the rotor assembly 14, the rotating magnetic flux field produced by the stator coacting with the hysteresis rings 37 in the well-known manner.

Generally the axial length of the radial or web portion 46 of the momentum ring is such that the thrust bearing surfaces 39 on the end-bells 30 and 31 are spaced away from one another by an amount slightly greater than the axial length of the thrust plate 18.

The general orientation of the rotor assembly on the stator assembly results in the rounded or cylindrical portions 16 and 17 of the shaft 15 to be disposed or lie in the bores 35 of the hub portions 34 of the end-bells. Generally the bores 35 are only slightly greater in diameter than the diameter of the cylindrical portions 16 and 17. This arrangement provides radial gas bearings at each end of the shaft 15.

Figure 4:
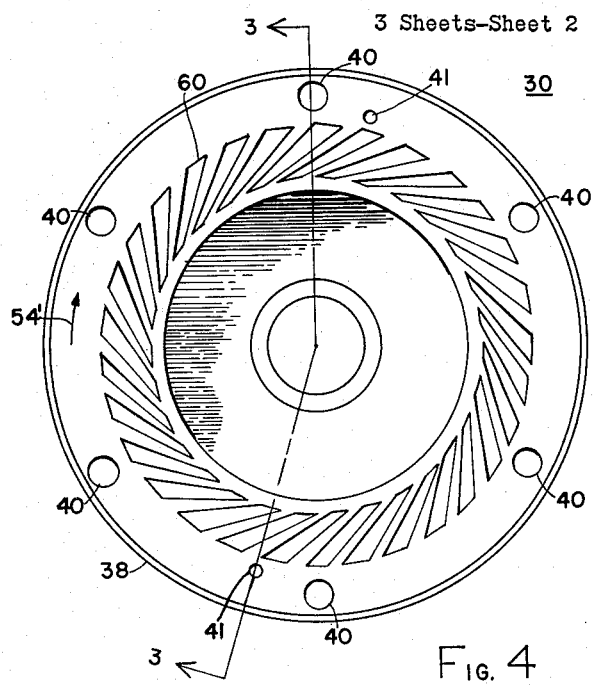
FIGURE 4 is an end view of the end-bell shown in FIGURE 3.

As indicated the motor shown in FIGURES 2-4 has the gas pumping means on the rotor assembly. More specifically each of the end-bells has on the axial face 39 of the flanged portion 38 thereof a plurality of pockets or grooves 60 which may take quite a wide variety of forms and shapes. The pockets 60 may be formed by various techniques, one of which is by etching. In one motor etching was used to produce pockets having a depth in the range of 0.000150 to 0.000350 inch.

Referring again to FIGURE 4, the grooves or pockets 60 are arranged on the axial face 39 of the flanged portion 38 of the end-bell 30 so as to have both radial and circumferential components of extent which results in a pressure gradient of the desired type to be produced when the rotor assembly is rotated in the direction of the arrow 54' relative to the stator assembly. More specifically, the grooves 60 are arranged so that the pressure of the gas is higher at the periphery 28 of the motor stator units than the pressure at the periphery 21 of the thrust plate 18.

The function of the apertures 41 is to permit the gas which may be of various types such as dry air, helium, hydrogen, nitrogen or the like to be drawn in at the periphery 21 of the thrust plate 18 and to be pumped by the pumping means including the pockets 60 inwardly to the periphery 28 of the motor stator means. The flow of gas is inwardly along the two axial faces 22 and 23 of the thrust plate to the periphery 28 of the motor stator means and thence axially out along the periphery 28 of the motor stator means against the radial ends of the end-bells 30 and 31. From that point the gas flows out through the narrow annular spaces defined between the rounded or cylindrical portions 16 and 17 of the shaft member 15 and the bore 35 of the hub portion 34. The two identified annular spaces thus serve the dual purpose of radial bearings and shaft seals.

The thrust bearing arrangement described (either the version of FIGURE 1 having the grooves or pockets on the thrust plate or the version of FIGURES 2-4 having the pockets or grooves on the end bells) is of the hydrodynamic or self-generating type. By "self-generating" is meant that the relative rotation of the two bearing parts per se produces the "pumping" action or generates the gas pressure which maintains the separation between the two relatively rotating parts. Thus, as long as there is relative rotation between the stator assembly 12 and the rotor assembly 14, there will be a continuous pumping action producing a gas pressure effective to maintain separation of the relatively rotating parts. As long as there is rotation, there will be some gas flow through the apertures 41 and out through the radial bearings defined by the hubs 34 and the rounded or cylindrical portions 16 and 17. The actual in-flow of gas is substantial only while the rotor is coming up to speed, during which time pressure buildup and therefore compression of gas takes place in the thrust bearing. Once the rotor is up to speed, then the gas flow is relatively low equal only to the leakage out through the radial bearings.

As indicated the axial thickness of the radial or web portion 46 of the momentum ring is selected so that the axial faces 39 of the flanged portion 38 of the end-bells will be spaced apart by an amount slightly greater than the axial spacing of the two axial faces 22 and 23 on the thrust plate. The spacing in this manner of the end-bells away from the thrust plate produces a pair of gaps identified in FIGURE 2 by the reference letters A and B. In practice the axial thickness of the web or radial portions 46 is selected so that the gaps A and B are made as short as possible consistent with the several design objectives of (1) obtaining high stiffness, (2) matching the axial stiffness of the thrust bearing to the radial stiffness of the radial bearing for isoelasticity, (3) matching the torque capability of the motor with the friction torque of the rotor (the friction torque varying inversely with the gap), and (4) coming within tolerance limitations arising from the state of the art of machining.

The primary advantage of having a higher pressure at the periphery 28 of the motor stator means than at the periphery 21 of the thrust plate 18 in addition to the load supporting forces produced within the gaps A and B is that the higher pressure is applied to the radially extending portions of the end-bell. Under a steady state condition the pressures so applied to the end-bells produce forces analogous to those applied to a double acting piston in a cylinder, and serve as a preloading tending to stabilize the axial position of the rotor assembly relative to the stator assembly. If something occurs so as to place an axial loading on the rotor assembly tending to shift it axially in one sense or the other then the axial forces caused by the gas pressure being applied against the radial portions of the end bells will serve to lessen the effect or will tend to neutralize the axial shifting. To explain, assume that there is an accelerational force being applied to the device shown in FIGURE 2 along the longitudinal axis of the shaft 15, the sense of the acceleration being to displace the rotor assembly to the left so as to increase gap A and so as to decrease gap B. Due to the increase of the gap A, the gas pressure on the left side of the motor as shown in FIGURE 2 would be decreased further, due to the decrease in gap B the gas pressure on the right side of the motor as shown in FIGURE 2 would be increased. Thus, there is a differential pressure action produced with a substantially higher than normal pressure being applied against the radial portion of the end-bell 31 and a substantially lower than normal pressure being applied against the radial portion of the end-bell 30. This differential pressure action thus produces an axial force on the rotor assembly of the opposite sense from that of the initial acceleration disturbance. The net result is that the total shift of the rotor assembly relative to the stator assembly is much less than would occur except for the present invention.

The above described differential pressure action in a sense may be likened to a closed loop pneumatic servo system including control valve means, piston means, and mechanical follow-up or feedback means. The two films (in gaps A and B) do the valving, the end-bell chambers serve as pneumatic pistons, and the resultant effect (axial shifting) on the rotor assembly provides the mechanical follow-up. The valves (gaps A and B) are thus positioned in accordance with the load or force axially applied to the motor.

It was briefly mentioned above that the present invention provides an extremely short differential thermal expansion path from one face of the thrust element across the film of gas to the rotor and through the rotor and the film of gas on the other face of the thrust element and through the thrust element back to the initial face. The short differential thermal expansion path is designated in FIGURE 2 by the reference numeral 65. This short differential thermal expansion path is inherently produced by the present invention in having only a single centrally positioned thrust element in combination with a unique rotor.

The significance of the short differential thermal expansion path from the standpoint of gyro performance will be understood when it is considered that the change in length of a member is a function of (1) linear coefficient of thermal expansion per degree of temperature change, (2) temperature change in degrees, and (3) length of the member. Ideally, there would be no differential expansion if all parts of the spin motor included in the path were made of material having the same coefficient of expansion and if there was no difference in temperature (temperature gradient) throughout the gyro parts in the path. In the practical case, it is not always possible to match expansion coefficients and while attempts are made to keep temperatures uniform, it is not possible to have heat flow out of a part unless there is a temperature difference. The unique configuration of the present invention in providing a short differential thermal expansion path accordingly minimizes the effects of mismatched coefficients of expansion and of temperature gradients. The short path also offers less resistance to heat flow and accordingly reduces the temperature gradient.

Differential thermal expansion of the rotor with respect to the stator in the axial direction is not constrained; the hublike portions 34 of the end-bells are free to move axially with respect to the cylindrical portions 16 and 17 of the shaft 15 (FIGURE 2). The symmetry of the motor configuration from the standpoint of mechanical, electrical and thermal considerations results in substantially equal and opposite movements of the ends with respect to the central thrust member so that the center of gravity remains fixed and mass unbalance shifts are thereby minimized. It will be understood that mass unbalance shifts are detrimental to the performance of a gyro.

Figure 5:
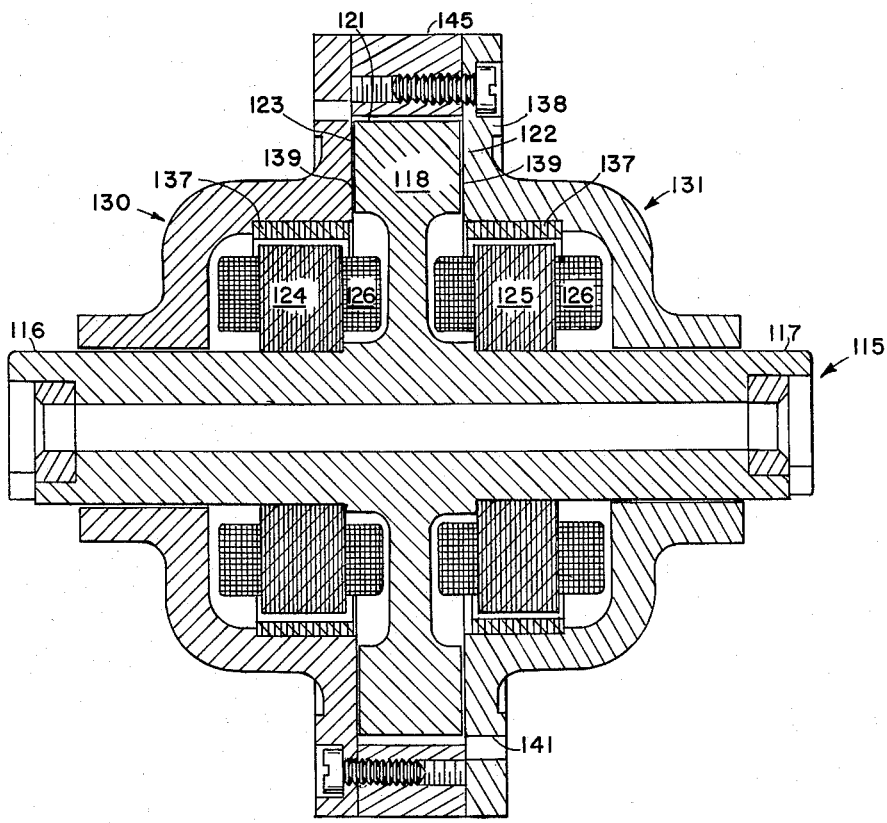
FIGURE 5 is a cross section of another embodiment of the present invention.

In FIGURE 5 is depicted another embodiment of the invention wherein a shaft 115 is provided with cylindrical portions 116 and 117. The shaft 115 has a central thrust portion 118 which generally extends in a radial direction and terminates with a circular periphery 121. A complete motor stator unit is provided on each side of the thrust portion 118. The motor stator units include core means 124 and 125 respectively provided with suitable winding means 126 adapted to be energized by suitable means not shown so as to produce a rotating magnetic field. A momentum ring 145 having an inner periphery slightly greater in diameter than the diameter of the thrust plate 118 is abutted on its two axial ends by the outer portion of flanged portions 138 of a pair of end-bells 130 and 131. The flanged portions 138 have axial faces 139 adapted to coact with the axial faces 122 and 123 of the thrust plate 118. Suitable means such as laminated hysteresis rings 137 are mounted within the hollow drum portion of the end-bells 130 and 131. A plurality of apertures 141 are provided to perform the same function as the apertures 41 of the device shown in FIGURE 2. As was the case previously, the self-generating gas thrust bearing may have the pockets or grooves either on the relatively stationary part or on the relatively rotating part of the thrust bearing. Further, it will be understood by those skilled in the art that various other thrust bearing configurations such as steps may be provided on one of the relatively rotating parts of the thrust bearing. This is of course also true for the other spin motors already described.

Figure 6:
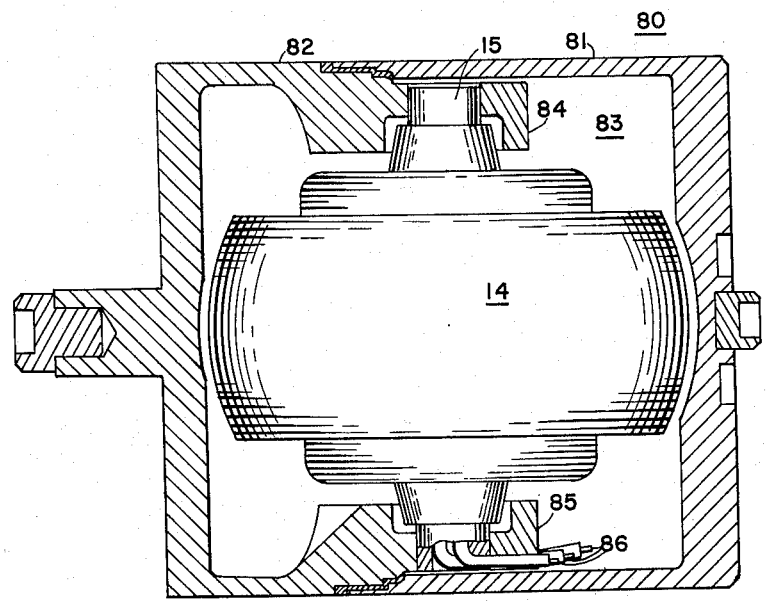
FIGURE 6 is a view of an arrangement for mounting one of the spin motors as shown in FIGURES 1, 2 or 5 in a gimbal for use in a floated gyro.

FIGURE 6 depicts a typical gimbal assembly in which is mounted the gas bearing spin motor of FIGURE 2. The gimbal assembly is generally designated by the reference numeral 80 and comprises a pair of cuplike housing members 81 and 82 adapted to fit together so as to define a hollow enclosure 83 for the motor including the rotor assembly 14. The shaft member 15 is shown to be clamped in a pillow-block type of arrangement 84 and 85. Lead members 86 are shown to extend through a hollow bore 87 in the shaft 15 and are connected to the winding means 26 on the motor stator unit. The axial ends of the cup members 81 and 82 of the gimbal assembly 80 are provided with suitable means for mounting the gimbal for rotation relative to a main housing not shown.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What we claim is:

1. In a gas bearing spin motor: a stator assembly comprising an elongated shaft member having cylindrical portions adjacent each end thereof and a centrally positioned radially extending thrust plate, said thrust plate having a general circular periphery and a pair of axial thrust bearing surfaces, and electric motor stator means including laminated core means and winding means adapted to be energized so as to produce a rotating magnetic field mounted on said shaft member on opposite sides of said thrust plate, said motor stator means having a substantially circular periphery smaller in diameter than that of said thrust plate; and a rotor assembly comprising in part a pair of end-bell members and a central momentum ring, each of said end-bell members having an axially extending hollow drum portion mounting an electric motor rotor element and with one end of said drum portion being substantially closed off with an end wall comprising a centrally positioned hub portion having an axial bore therethrough and said drum portion further having a flanged portion radially extending from the other end thereof, said rotor assembly further comprising means connecting said flanged portions to said central momentum ring, said momentum ring having an inner diameter larger than said diameter of said thrust plate and spacing said flanged portions apart by an amount slightly greater than the axial length of said thrust plate, and said rotor assembly being positioned with respect to said shaft member so that said flanged portions are adjacent to said axial thrust bearing surfaces of said thrust plate and so that said cylindrical portions of said shaft are positioned in said axial bores in said hub portions.

2. In a gas bearing spin motor: an elongated shaft member having cylindrical portions adjacent each end thereof and a centrally positioned radially extending thrust plate, said thrust plate having a general circular periphery and a pair of axial thrust bearing surfaces; stator means including laminated core means and winding means adapted to be energized mounted on said shaft member on opposite sides of said thrust plate, said core means having a circular periphery smaller in diameter than that of said thrust plate; a rotor assembly comprising a pair of end-bell members and a central momentum ring, each of said end-bell members having an axially extending hollow drum portion with one end thereof substantially closed off with a centrally positioned hub portion having an axial bore therethrough and a flanged portion radially extending from the other end thereof, said rotor assembly further comprising means connecting said flanged portions to said central momentum ring, said momentum ring having an inner diameter larger than said diameter of said thrust plate and spacing said flanged portions apart by an amount slightly greater than the axial length of said thrust plate, and said rotor assembly being positioned with respect to said shaft member so that said flanged portions are adjacent to said axial thrust bearing surfaces of said thrust plate and so that said cylindrical portions of said shaft are positioned in said axial bores in said hub portions; and laminated hysteresis ring means on said rotor assembly adapted to coact with said stator means so as to impart an angular velocity to said rotor assembly.

3. In a gas bearing spin motor: a stator assembly comprising an elongated shaft member having cylindrical portions and a centrally positioned radially extending thrust plate, said thrust plate having a pair of axial thrust bearing surfaces, and motor means adapted to be actuated and mounted on said shaft member on opposite sides of said thrust plate; and a rotor assembly comprising in part a pair of end-bell members and a central momentum ring, each of said end-bell members having an axially extending hollow drum portion including means adapted to coact with said motor means and with one end of said drum portion being substantially closed off with an end wall comprising a centrally positioned hub portion having an axial bore therethrough and said drum portion further having a flanged portion radially extending from the other end thereof, said rotor assembly further comprising means connecting said flanged portions to said central momentum ring, said momentum ring being adapted to encircle said thrust plate and spacing said flanged portions apart by an amount slightly greater than the axial length of said thrust plate, and said rotor assembly being positioned with respect to said shaft member so that said flanged portions are adjacent to said axial thrust bearing surfaces of said thrust plate and so that said cylindrical portions of said shaft are positioned in said axial bores in said hub portions.

4. In a gas bearing spin motor: a stator assembly comprising an elongated shaft member having cylindrical portions adjacent each end thereof and a centrally positioned radially extending thrust plate, said thrust plate having thrust bearing surfaces on the axial faces thereof, and motor means adapted to be actuated and connected to said shaft member on opposite sides of said thrust plate; and a rotor assembly comprising in part a pair of end-bell members each having an axially extending hollow drum portion including means adapted to coact with said motor means and with one end thereof having a centrally positioned radial bearing portion with an axial bore therethrough and a flanged portion radially extending from the other end thereof, said rotor assembly further comprising means connecting said pair of end-bell members together with said flanged portions being spaced apart by an amount slightly greater than the axial length of said thrust plate, and said rotor assembly being positioned with respect to said shaft member so that said flanged portions are adjacent to said axial thrust bearing surfaces of said thrust plate and so that said cylindrical portions of said shaft are positioned in said axial bores of said radial bearing portions.

5. In a gas bearing spin motor: a stator assembly comprising an elongated shaft member having cylindrical portions adjacent each end thereof and a centrally positioned thrust member, said thrust member having axial thrust bearing means on the axial faces thereof, and motor means on said shaft member; and a rotor assembly comprising in part a pair of end-bell members each having an axially extending hollow drum portion including means adapted to coact with said motor means and with one end thereof having a centrally positioned radial bearing portion with an axial bore therethrough, said rotor assembly further comprising means connecting said pair of end-bell members together and with said rotor assembly being positioned with respect to said shaft member so that the other ends of said hollow drum portions are adjacent to said axial thrust bearing means of said thrust member and so that said cylindrical portions of said shaft are positioned in said axial bores of said radial bearing portions.

6. In a gas bearing spin motor: a stator assembly comprising an elongated shaft member having cylindrical portions adjacent each end thereof and a radially extending thrust plate, said thrust plate having axial thrust bearing means on the axial faces thereof, said motor means connected to said shaft member on opposite sides of said thrust plate; and a rotor assembly comprising in part a pair of end-bell members each having an axially extending hollow drum portion having a centrally positioned radial bearing portion with an axial bore therethrough at one end thereof and axial thrust bearing means on the other end thereof, said rotor assembly further comprising means connecting said pair of end-bell members together with said rotor axial thrust bearing means being positioned adjacent to said stator axial thrust bearing means and with said cylindrical portions of said shaft positioned in said axial bores of said radial bearing portions.

7. In a gas bearing spin motor: a stator assembly comprising an elongated shaft member having a cylindrical portion adjacent each end thereof and a centrally positioned radially extending first thrust element, said first thrust element having a generally circular periphery and a pair of axially spaced first axial thrust bearing surfaces, and electric motor stator means including laminated core means and winding means adapted to be energized so as to produce a rotating magnetic field mounted on said shaft member on opposite sides of said first thrust element, said motor stator means having a substantially circular periphery smaller in diameter than that of said first thrust element; and a rotor assembly comprising in part a pair of end-bell members and a central momentum ring, each of said end-bell members having an axially extending hollow drum portion mounting an electric motor rotor element and with one end of said drum portion having an end wall which closes off said one end except for an axial bore therethrough and said drum portion further having a flanged portion radially extending from the other end thereof and said flanged portion having a second axial thrust bearing surface, said rotor assembly further comprising means connecting said flanged portions of said end-bell members to said central momentum ring, said momentum ring having an inner diameter larger than said diameter of said first thrust element and spacing said second axial thrust bearing surfaces apart by an amount slightly greater than the axial spacing of said first axial thrust bearing surfaces, said rotor assembly being positioned with respect to said stator assembly so that one of said first thrust bearing surfaces is adjacent to one of said second thrust bearing surfaces and so that said cylindrical portions of said shaft member are positioned in said axial bores, said bores being characterized by being slightly larger in diameter than the diameter of said cylindrical portions and said bores and said cylindrical portions constituting radial gas bearing means, and some of said thrust bearing surfaces being characterized by having a plurality of grooves, each groove having radial and circumferential components of extent and functioning when said rotor assembly is rotated by energization of said electric motor stator means to provide a gas pressure gradient which is an inverse function of the distance from the rotational axis of said rotor assembly.

8. In a self-generating gas bearing spin motor: an elongated shaft member including a cylindrical portion adjacent each end thereof and a centrally positioned radially extending thrust portion having a generally circular periphery and a pair of axially spaced axial thrust bearing surfaces; motor means mounted on said shaft member on opposite sides of said thrust portion; and a rotor assembly comprising in part a pair of end-bell members and a central momentum ring, each of said end-bell members having an axially extending hollow drum portion with one end of said drum portion having a radial gas bearing portion which closes off said one end except for an axial bore therethrough and said drum portion further having a flanged portion radially extending from the other end thereof and including an axial thrust bearing surface, said rotor assembly further comprising means connecting said flanged portions of said end-bell members to said central momentum ring, said momentum ring having an inner diameter larger than said diameter of said first thrust portion and spacing said end-bell axial thrust bearing surfaces apart by an amount slightly greater than the axial spacing of said pair of axial thrust bearing surfaces, said rotor assembly being positioned with respect to said shaft member so that one of said pair of thrust bearing surfaces is adjacent to one of said end-bell thrust bearing surfaces and so that said cylindrical portions of said shaft member are positioned in said axial bores, said bores and said cylindrical portions constituting radial gas bearing means, and some of said thrust bearing surfaces being characterized by having means functioning when said rotor assembly is rotated relative to said shaft member to provide a gas pressure gradient which is an inverse function of the distance from the rotational axis of said rotor assembly.

9. In a gas bearing spin motor: a stator assembly comprising a shaft member having journalled portions thereon and a centrally positioned radially extending thrust element, said thrust elements having a pair of axially spaced axial thrust bearing surfaces, and motor means mounted on said shaft member; and a rotor assembly comprising in part a pair of end-bell members each having an axially extending hollow drum portion one end of which is closed off with radial bearing means having an axial bore therethrough and said drum portion further having an axial thrust bearing surface on the other end, said rotor assembly further comprising means connecting together said end-bell members, said end-bell axial thrust bearing surfaces being spaced apart by an amount slightly greater than the axial spacing of said thrust element axial thrust bearing surfaces, said rotor assembly being positioned with respect to said stator assembly so that one of said thrust element thrust bearing surfaces is adjacent to one of said end-bell thrust bearing surfaces and so that said journalled portions of said shaft member are positioned in said axial bores, said bores being characterized by being slightly larger in diameter than the diameter of said cylindrical portions and said bores and said cylindrical portions constituting radial gas bearing means, and some of said thrust bearing surfaces being characterized by having a plurality of grooves, each groove having radial and circumferential components of extent and functioning when said rotor assembly is rotated by said motor means to provide a gas pressure gradient, which is an inverse function of the distance from the rotational axis of said rotor assembly.

10. Apparatus of the class described: a round shaft member having positioned centrally thereon a grooved circular thrust plate; stator means including laminated core means and winding means on said core means mounted on said shaft on opposite sides of said thrust plate, said core means having a circular periphery substantially less in diameter than the diameter of said circular thrust plate; and a rotor assembly mounted for rotation on said shaft, said rotor assembly comprising a pair of end-bell members and a momentum ring, each of said end-bell members having a central radial bearing portion adapted to receive one end of said shaft member, said end-bell members further comprising a hollow drum portion at one end connected to said central radial bearing portion and having at its other end an outwardly-extending flanged portion, said end-bell members being adapted to be mounted on said shaft member with the outer radial portion of said flanged portions secured to opposite axial faces on said momentum ring, and with the inner radial portion of said flanged portions being positioned adjacent to opposite sides of said thrust plate.

11. In a self-generating gas bearing spin motor: a shaft member; a plate centrally positioned on said shaft, said plate radially extending from said shaft and having first thrust bearing means on two axial faces thereof; motor stator means mounted on said shaft on opposite sides of said plate; a rotor member; and rotary gas bearing means rotatably mounting said rotor member on said shaft, said rotor member having second thrust bearing means adapted to coact with said first thrust bearing means so that said rotor member is rotatably supported in an axial sense, said motor being characterized by having a relatively short differential thermal expansion path from one face of said plate through said rotor to said other face and through said plate back to said one face.

12. In a self-generating gas bearing spin motor: a shaft member; a thrust member centrally positioned on said shaft member, said thrust member radially extending from said shaft member and having first thrust bearing means on two axially spaced axial faces thereof; motor means mounted on said shaft; and a rotor member adapted to coact with said motor means and rotatably mounted on said shaft member, said rotor member having second thrust bearing means adapted to coact with said first thrust bearing means so that said rotor member is rotatably supported in an axial sense relative to said shaft member, said motor being characterized by having a relatively short differential thermal expansion path from one face of said thrust member through said rotor to said other face and through said thrust member back to said one face of said thrust member.

13. In a self-generating gas bearing spin motor: a shaft member; a plate positioned on said shaft, said plate radially extending from said shaft and having first thrust bearing means on two axial faces thereof; motor means mounted on said shaft on opposite sides of said plate; a rotor member; and rotary gas bearing means rotatably mounting said rotor member on said shaft, said rotor member having second thrust bearing means adapted to coact with said first thrust bearing means so that said rotor member is rotatably supported relative to said shaft member, said motor being characterized by having a relatively short differential thermal expansion path from one face of said plate through said rotor and and said plate back to said one face.

14. In a self-generating gas bearing spin motor: a relatively stationary member; a thrust portion located on said stationary member, said thrust portion radially extending from said stationary member and having first thrust bearing means on two axially spaced axial faces thereof; a rotor member; radial bearing means rotatably mounting said rotor member on said stationary member, said rotor member having second thrust bearing means adapted to coact with said first thrust bearing means so that said rotor member is rotatably supported in an axial sense relative to said stationary member, said motor being characterized by having a relatively short differential thermal expansion path from one face of said thrust portion through said rotor member to the other face of said thrust portion and through said thrust portion back to said one face of said thrust portion.

15. In a self-generating gas bearing spin motor: a relatively stationary member; a thrust portion centrally located on said stationary member, said thrust portion radially extending from said stationary member and having first thrust bearing means on two axially spaced axial faces thereof; a rotor member; radial gas bearing means rotatably mounting said rotor member on said stationary member, said rotor member having second thrust bearing means adapted to coact with said first thrust bearing means so that said rotor member is rotatably supported in an axial sense relative to said stationary member, said motor being characterized by having a relatively short differential thermal expansion path from one face of said thrust portion through said rotor member to the other face of said thrust portion and through said thrust portion back to said one face of said thrust portion; and coacting means on said stationary member and on said rotor member for imparting angular rotation to said rotor member relative to said stationary member.

16. In a gas lubricated rotatable assembly: a relatively stationary element having a pair of spaced coaxial journal portions and a thrust member positioned intermediate said journal portions, said thrust element having axial thrust bearing means on opposite axial faces thereof; a rotor assembly adapted to be associated with and to rotate relative to said relatively stationary element, said rotor assembly comprising a pair of spaced radial bearing portions adapted to be positioned adjacent to and to coact with said coaxial journal portions, a pair of axial thrust bearing surface portions adapted to be positioned adjacent to and to coact with said axial thrust bearing means, and a pair of radially extending portions connecting said radial bearing portions and said axial thrust bearing surface portions; and means including said coacting thrust bearing means and said pair of axial thrust bearing surface portions for applying gas pressures to said pair of radially extending portions, said assembly functioning as a closed loop pneumatic system so as to restrain relative axial movement between said stationary element and said rotor assembly.

17. In a gas lubricated rotatable assembly: a relatively stationary element having a pair of spaced coaxial journal portions and a thrust member positioned intermediate said journal portions, said thrust element having axial thrust bearing means on opposite axial faces thereof; a rotor assembly adapted to be associated with and to rotate relative to said relatively stationary elements, said rotor assembly comprising a pair of spaced radial bearing portions adapted to be positioned adjacent to and to coact with said coaxial journal portions as hydrodynamic radial bearing means, a pair of axial thrust bearing surface portions adapted to be positioned adjacent to and to coact with said axial thrust bearing means as hydrodynamic thrust bearing means, and a pair of radially extending portions connecting said radial bearing portions and said axial thrust bearing surface portions; and means including said coacting thrust bearing means and said pair of axial thrust bearing surface portions for applying variable gas pressures to said pair of radially extending portions as a function of relative axial movement between said stationary element and said rotor assembly, said assembly functioning as a closed loop pneumatic system so as to restrain relative axial movement between said stationary element and said rotor assembly.

References Cited in the file of this patent

UNITED STATES PATENTS

| | | |
|---|---|---|
| 2,653,481 | Mathiesen | Sept. 29, 1953 |
| 2,671,700 | Seyfert | Mar. 9, 1954 |
| 2,928,960 | Mack | Mar. 15, 1960 |